United States Patent
Yeh et al.

(10) Patent No.: US 6,848,758 B1
(45) Date of Patent: Feb. 1, 2005

(54) DO IT YOURSELF (DIY) MODULAR CABINET

(76) Inventors: Chih-Cheng Yeh, No. 41, Peichuang Rd., Shenkang Hsiang, Taichung Hsien (TW); Nan-Chang Liang, 7F, No. 156, Shekou St., Shenkang Hsiang, Taichung Hsien (TW)

( * ) Notice: Subject to any disclaimer, the term of this patent is extended or adjusted under 35 U.S.C. 154(b) by 0 days.

(21) Appl. No.: 10/697,020

(22) Filed: Oct. 31, 2003

(51) Int. Cl.$^7$ .............................................. A47B 43/00
(52) U.S. Cl. ...................... 312/258; 312/322; 312/259; 312/257.1
(58) Field of Search ............................. 312/257.1, 258, 312/259, 326, 329, 322; 16/235, 261, 271, 272; 211/195, 26, 189

(56) References Cited

U.S. PATENT DOCUMENTS

| | | | | |
|---|---|---|---|---|
| 5,662,399 A | * | 9/1997 | Henkel et al. ............... | 312/258 |
| 5,664,854 A | * | 9/1997 | Letch .......................... | 312/262 |
| 5,906,421 A | * | 5/1999 | Floyd .......................... | 312/297 |
| 6,039,419 A | * | 3/2000 | Brown et al. ................ | 312/262 |
| 6,158,831 A | * | 12/2000 | Brown et al. ................ | 312/258 |
| 6,430,778 B1 | * | 8/2002 | King ............................ | 16/382 |
| 6,502,909 B1 | * | 1/2003 | Swilik et al. ................ | 312/263 |
| 6,561,601 B1 | * | 5/2003 | Maffeo ..................... | 312/257.1 |
| 6,648,144 B2 | * | 11/2003 | Vogel .......................... | 209/554 |
| 6,722,750 B2 | * | 4/2004 | Chan ........................... | 312/258 |

* cited by examiner

*Primary Examiner*—Peter M. Cuomo
*Assistant Examiner*—Erika Garrett
(74) *Attorney, Agent, or Firm*—Dennison, Schultz, Dogherty & MacDonald

(57) ABSTRACT

A DIY cabinet has a foldable frame, a top panel, a bottom panel, a rear panel and multiple pop-it fasteners. The panels are attached to the foldable frame with the pop-it fasteners. Each pop-it fastener is composed of a countersunk tube and a stud. The countersunk tubes are pressed into head holes in panels, and the studs are screwed into and extend from base holes in the foldable frame and align with corresponding head holes in the panels. The studs extending from the base holes are pressed respectively into the countersunk tube in the head holes. Thereby, the panels are conveniently mounted on the foldable frame without using any tools. Moreover, the foldable frame can be folded to reduce the size of the disassembled DIY cabinet.

8 Claims, 5 Drawing Sheets

DO IT YOURSELF (DIY) MODULAR CABINET

BACKGROUND OF THE INVENTION

1. Field of the Invention

The present invention relates to a cabinet, and more particularly to a do it yourself (DIY) modular cabinet that can be conveniently assembled or disassembled without using any tools.

2. Description of Related Art

Do it yourself (DIY) modular furniture is currently popular because DIY furniture can be transported easily after being disassembled into component pieces and also can be changed into different forms depending on different requirements. Additionally, people enjoy a sense of achievement when the furniture is completed.

However, DIY modular furniture still has some disadvantages because tools are needed when the furniture is assembled or disassembled. For example, a conventional DIY cabinet is composed of multiple boards or sheets of materials to fabricate a frame in which objects are held. Fastening devices detachably used to connect adjacent boards or sheets of materials to construct a frame are mostly flat-head or oval-head countersunk screws that require a suitable screwdriver to fasten or release the countersunk screws. Therefore, assembling or disassembling the DIY cabinet is inconvenient or impossible when suitable tools are not available.

The present invention has arisen to mitigate or obviate the disadvantages of the conventional DIY cabinet.

SUMMARY OF THE INVENTION

The main objective of the present invention is to provide a do it yourself (DIY) modular cabinet that can be conveniently assembled and disassembled without using any tools.

A DIY cabinet in accordance with the present invention has a foldable frame, a top panel, a bottom panel, a rear panel, multiple pop-it fasteners, optionally at least one door assembly and an optional shelf. The panels are attached to the frame with the pop-it fasteners. Each pop-it fastener is composed of a countersunk tube and a stud. The countersunk tubes are pressed into head holes in the top and bottom panels, and the studs are screwed into and extend from base holes in the panels corresponding to the head holes containing the countersunk tubes. The studs extending from the base holes are pressed respectively into the countersunk tubes. Thereby, the panels are conveniently mounted on the frame without using any tools. Moreover, the foldable frame reduces the size of the disassembled cabinet.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
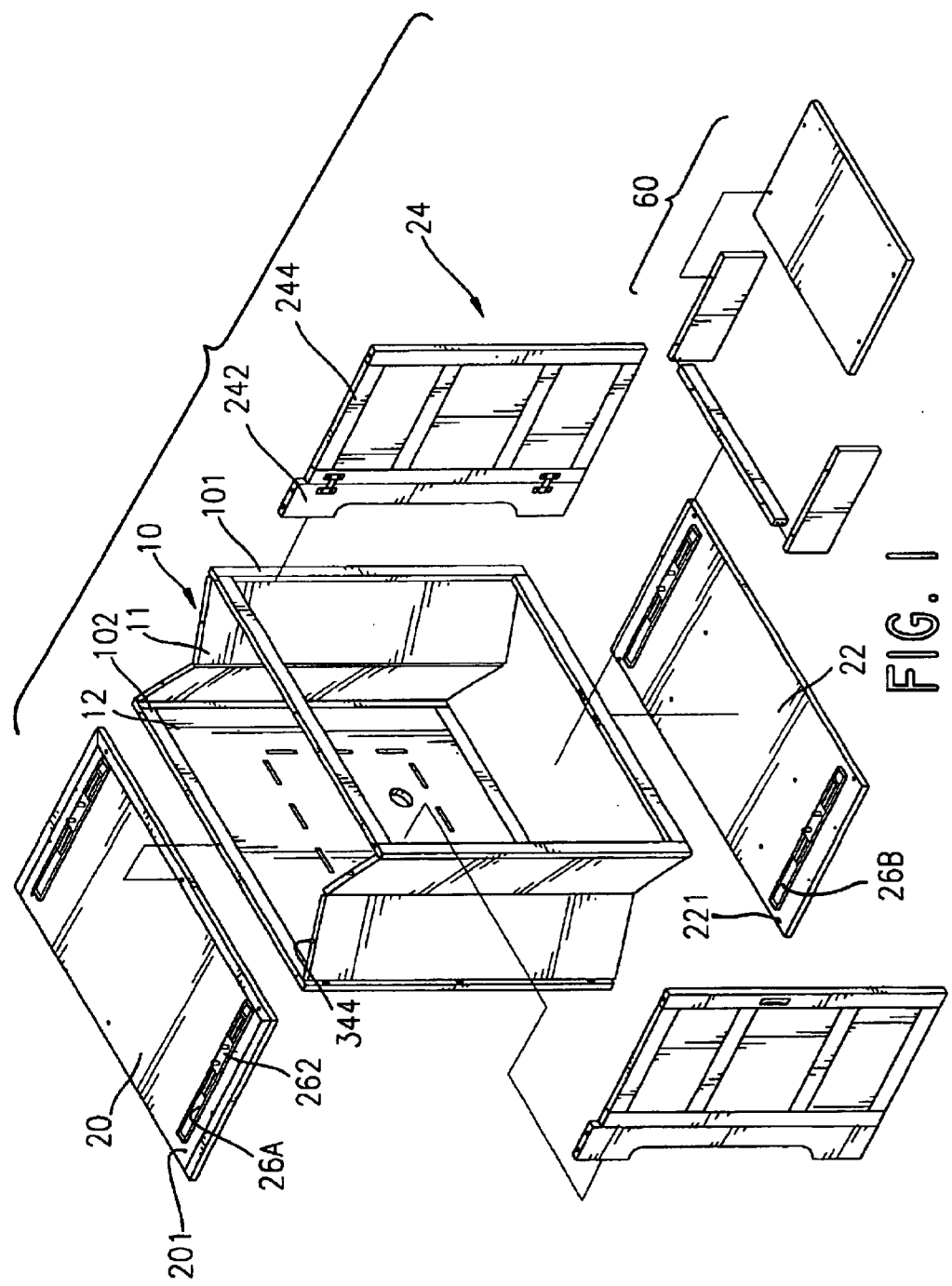
FIG. 1 is an exploded perspective view of a DIY modular cabinet in accordance with the present invention.
Figure 2:
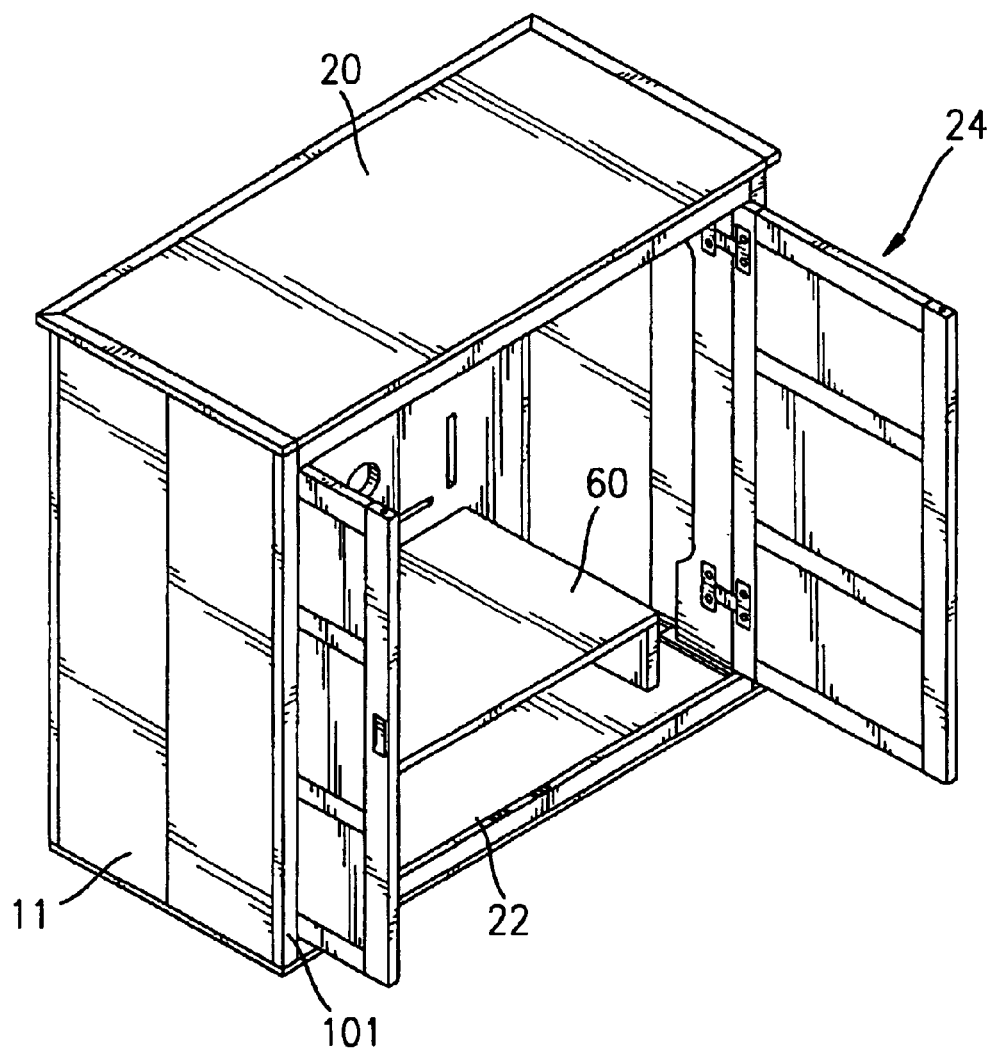
FIG. 2 is a perspective view of the DIY modular cabinet in FIG. 1.
Figure 3:
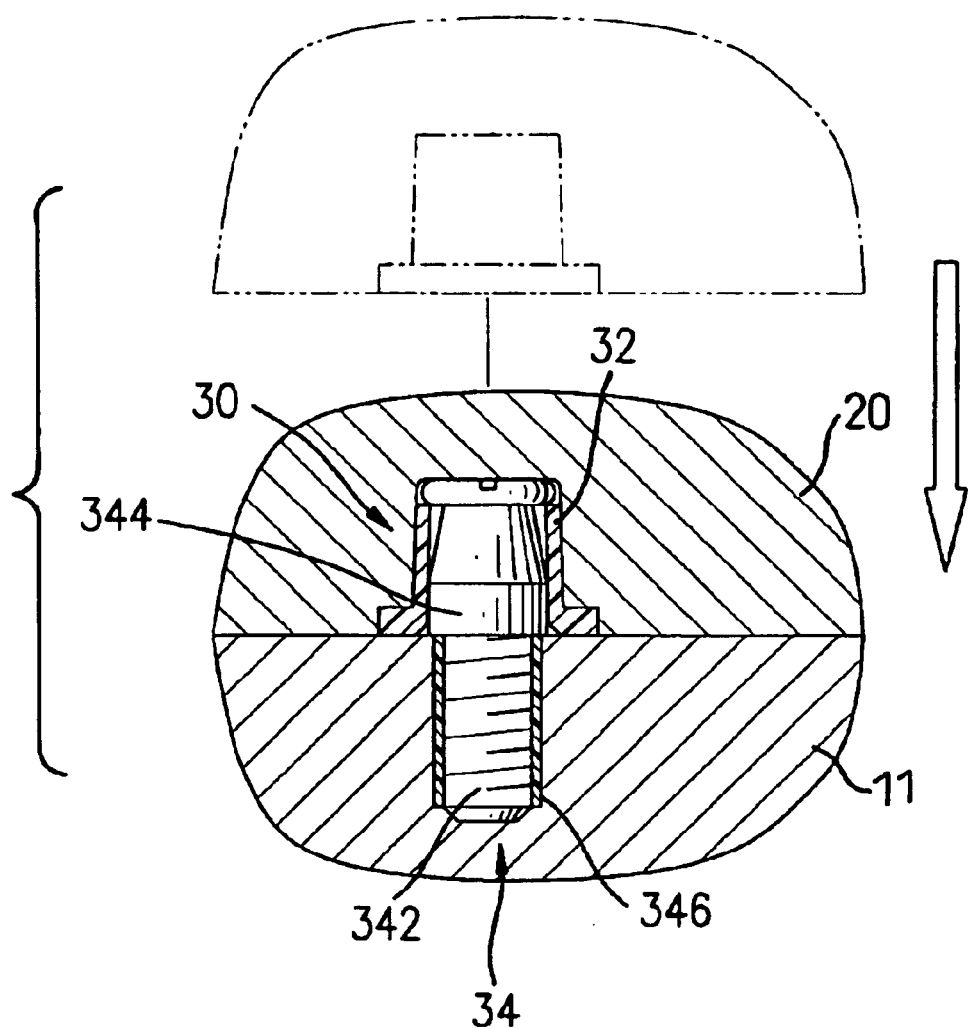
FIG. 3 is an enlarged side plan view in partial section of a pop-it fastener in the DIY modular cabinet in FIG. 1.

With reference to FIGS. 1, 2 and 3, a do it yourself (DIY) modular cabinet in accordance with the present invention comprises a foldable frame (10), a rear panel (12), a top panel (20), a bottom panel (22), multiple pop-it fasteners (30), multiple hinges (not numbered), optional at least one door set (not numbered) and an optional shelf (60). The panels (12, 20, 22) are attached to the foldable frame (10) with the multiple pop-it fasteners (30).

The foldable frame (10) is a right parallelepiped with a top (not numbered), a bottom (not numbered), two sides (not numbered), a back (not numbered) and a front (not numbered) and is composed of a front frame (101), a rear frame (102) and two foldable side panels (11).

The front frame (101) and rear frame (102) respectively have an inside surface (not numbered), an outside surface (not numbered), a top (not numbered), a bottom (not numbered), a left side (not numbered), a right side (not numbered), multiple base holes (not numbered) and optional multiple mortises (not shown). The top, bottom, left side and right side of the front and rear frames (101, 102) have outside edges (not numbered). The left side and right side optionally have mortises (not shown) formed in inside surfaces.

Figure 4:
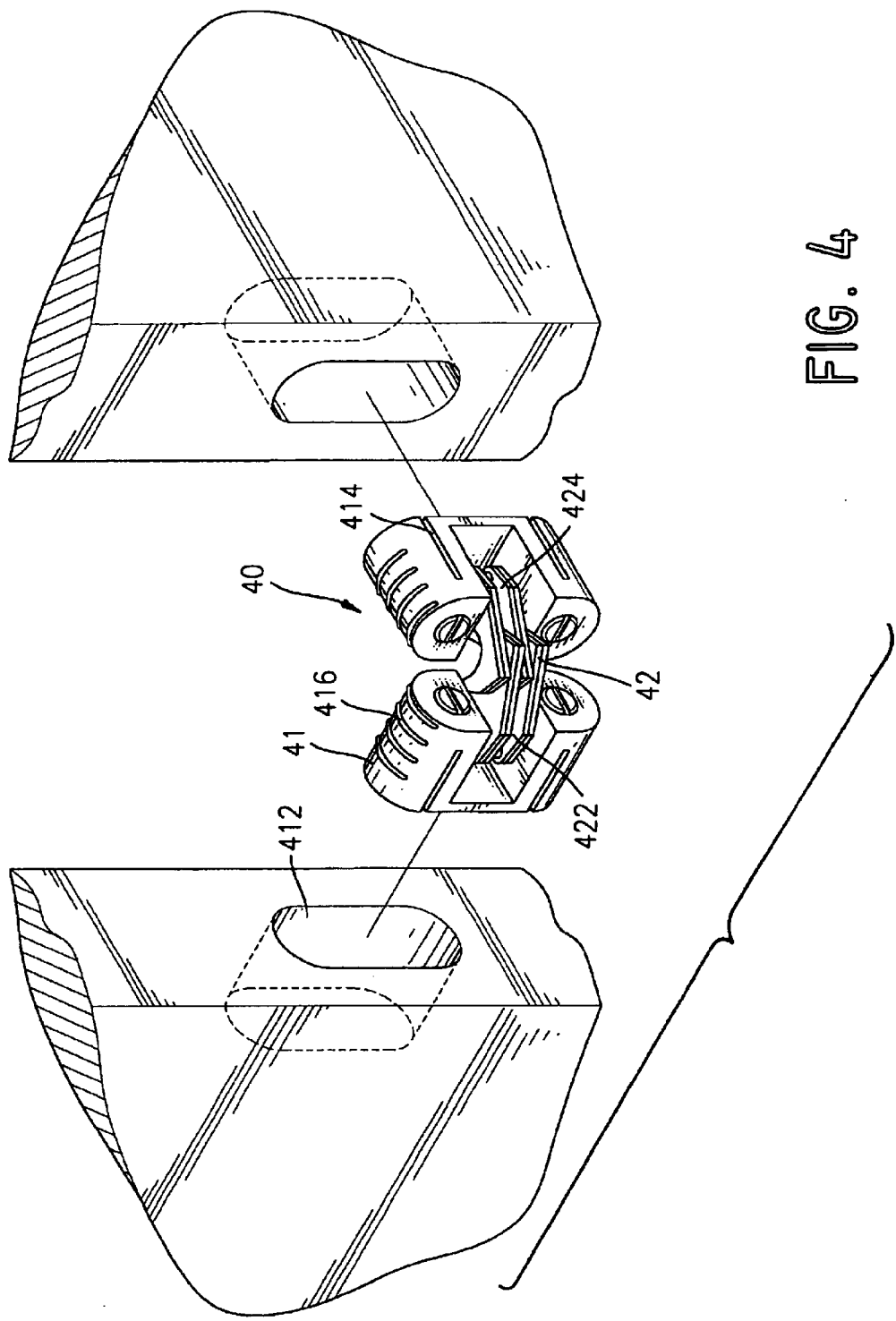
FIG. 4 is an enlarged exploded perspective view in partial of a countersunk flush mounted hinge in the DIY modular cabinet in FIG. 1.

With further reference to FIG. 4, the two foldable side panels (11) are pivotally attached respectively between the right and left sides of the front frame (101) and the rear frame (102) and respectively comprise a front board (not numbered) and a rear board (not numbered) and multiple hinges (40). The front and rear boards in each foldable side panel (11) have inner edges (not numbered), outer edges (not numbered), top edges (not numbered), bottom edges (not numbered), multiple base holes (not numbered) and multiple optional mortises (412). The base holes are formed in the top and bottom edges of the front and the rear boards and may be threaded. The mortises (412) are formed in the inner and outer edges of the front and rear boards. The inner edges are pivotally attached to each other so the foldable side panels (11) fold inward. Furthermore, the foldable side panels (11) are pivotally attached respectively to the right and left sides of the front frame (101) and the rear frame (102) at the outer edges of the front and the rear boards by multiple hinges (40). The hinges (40) may be countersunk flush mounted hinges.

With reference to FIG. 4, each countersunk flush mounted hinge comprises two tenons (41) and a metal pivot (42). Each tenons (41) is made of resilient material, has an inside end (not numbered), an outside end (not numbered), an upper edge (not numbered), a lower edge (not numbered), a recess (not numbered), multiple optional slits (414), multiple optional anti-slip ribs (416) and multiple optional expansion screws (not numbered). The tenons (41) are mounted respectively in mortises (412) defined in the front frame (101), the rear frame (102) and the front or rear boards of the foldable side panels (11). The slits (414) are defined longitudinally in the tenons (41) to allow the tenons (41) to compress slightly and easily wedge respectively into corresponding mortises (412). The anti-slip ribs (416) are formed transversely on the upper and lower edges of each tenon (41) to provide additional friction between the tenon (41) and the corresponding mortise (412) so the tenon (41) will not slip out of the mortise (412). The expansion screws are align ed respectively with the longitudinal slits (414) and screw into the tenon (41) to spread the tenon (41) and cause the tenon (41) to hold securely in the corresponding mortise (412).

The metal pivot (42) comprises two first sheets (422) and two second sheets (424). Each sheet (422, 424) has two ends (not numbered). The first and the second sheets (422, 424) are pivotally attached to each other at one end and are pivotally attached respectively in the corresponding recesses in the two tenons (41) at the other end. The countersunk flush mounted hinges are mounted between the front frame (101) and the outer edges of the front boards of the foldable side panels (111), between the rear frame (102) and the outer edges of the rear boards of the foldable side panels (11), and between the inner edges of the front and rear boards of the foldable side panels (11) to make the foldable side panels (11) pivot on the foldable frame (10).

The rear panel (12) is attached to the rear frame (102) and has multiple optional ventilating holes (not numbered).

The top panel (20) is attached to the top of the foldable frame (10) and has a bottom surface (not numbered) and multiple head holes (201). The head holes (201) are aligned with the multiple base holes (not numbered) in the top edge of the front and rear boards in each foldable side panel (11).

The bottom panel (22) is attached to the bottom of the foldable frame (10) and has a top face and multiple head holes (221). The head holes (221) are defined in the top face and corresponded to the base holes (not shown) defined in the bottom edge of the front and rear boards of the foldable side panel (11). Multiple pop-it fasteners (30) attach the top panel (20) and the bottom panel (22) to the foldable frame (10).

With reference to FIG. 3, each pop-it fastener (30) comprises a countersunk tube (32), a stud (34) and an optional threaded sleeve (346). The countersunk tube (32) is made of resilient material and is mounted respectively inside one corresponding head hole on the top or the bottom panel (20, 22). The optional threaded sleeve (346) is pressed into one corresponding base hole to keep the base hole from splitting. The stud (34) has a threaded rod (342) and a connecting head (344). The threaded rods (342) of the studs (34) are screwed respectively into base holes or the threaded sleeves (346) mounted in the base holes corresponding the head holes. The connecting heads (344) have an outer diameter, a flat end (not numbered) and an optional screwdriver slot (not numbered) and are pressed respectively into the countersunk tubes (32) to connect the surface with the base hole and to the surface with the head hole. The outer diameter of the connecting head (344) is larger than the countersunk tube (32). Consequently, the top panel (20) and the bottom panel (22) can be attached to the foldable fame (10) without using any tools.

The door set preferably has two symmetrical retractable door assemblies (24), a rail assembly (not numbered) corresponding to each door assembly (24) and at least one locking device (50). The two retractable door assemblies (24) are mounted inside the foldable frame (10) respectively on two rail assemblies. Each rail assembly is composed of a top rail (26A) and a bottom rail (26B). The top rail (26A) is attached to the bottom face of the top panel (20), and the bottom rail (26B) is attached to the top face of the bottom panel (22), the top and bottom rails (26A, 26B) align with each other. Each rail (26A, 26B) has a moving block (262). The moving block (262) has multiple pins (not numbered), is slidably mounted on the rail and detachably engages a retractable door assembly (24). Each retractable door assembly (24) has a doorjamb (242) and a door (244) pivotally attached to the doorjamb (242). The doorjamb (242) has a top edge, a bottom edge and multiple pinholes (not numbered) to respectively engage the pins on the moving block (262). Thereby, the retractable door assembly (24) is detachably attached to the rail assembly (26A, 26B) to slide inside the frame (10). When the retractable door assembly (24) is pulled out to a limiting position of the rail assembly, the door (244) can be pivoted inward to cover the front frame (101) of the frame (10).

Figure 5:
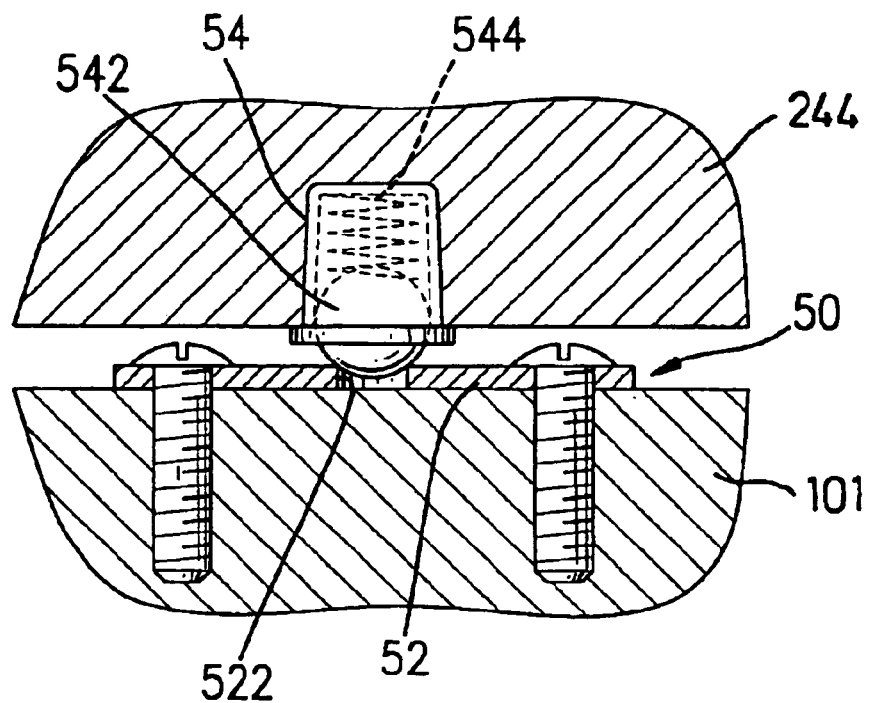
FIG. 5 is an enlarged side plan view in partial section of a locking device in the DIY modular cabinet in FIG. 1.

The at least one locking device (50) is mounted between the door (244) and the front frame (101) to make the door (244) stay closed against the front frame (101). With reference to FIG. 5, each locking device (50) has a plate (52) and a spring-loaded ball (54). The plate (52) has a dent (522) and is attached to the front frame (101). The spring-loaded ball (54) is partially embedded in the door (244) and has a housing (not numbered), a ball (542) and a spring (544). The ball (542) and the spring (544) are mounted inside the housing and align with the dent (522) in the plate (52). When the door (244) is closed, the ball (542) is pushed by the spring (544) to engage the dent (522) to hold the door (244) in position relative to the front frame (101).

The optional shelf (60) is assembled with the pop-it fasteners (30) and is mounted inside the foldable frame (10).

According to foregoing description, all elements of the DIY cabinet can be assembled or dissembled without any tools. Moreover, the DIY cabinet also does not occupy much space when disassembled because each panel can be detached from the foldable frame (10) and the foldable frame (10) can be folded to make the size of the cabinet as small as possible.

Although the invention has been explained in relation to multiple preferred embodiments, many other possible modifications and variations can be made without departing from the spirit and scope of the invention as hereinafter claimed.

What is claimed is:

1. A DIY cabinet comprising:
   a foldable frame being a right parallelepiped and having a top, a bottom, two sides, a back and a front and comprising
   a front frame;
   a rear frame; and
   two foldable side panels pivotally attached between the two frames and having a front board with a top edge and a bottom edge, a rear board with a top edge and a bottom edge, multiple hinges mounted between the front and rear boards and multiple base holes formed in the top and bottom edges of the front and rear boards;
   a rear panel detachably attached to the back of the foldable frame;
   a top panel having a bottom surface with multiple head holes formed in the bottom surface and detachably attached to the top of the foldable frame;
   a bottom panel having a top surface with multiple head holes formed in the top surface and detachably attached to the bottom of the foldable frame, wherein the multiple head holes respectively align with the multiple base holes on the foldable side panels;
   multiple hinges secured between the front board and rear board, between the rear board and the rear frame, and between the front board and the front frame; and
   multiple pop-it fasteners mounted between the foldable frame and the top and bottom panels, wherein each pop-it fastener comprises:
      a countersunk tube made of resilient material and pressed into one of the head holes in one of the panels; and a stud engaging the countersunk tube and having a threaded rod that screws into one of the base holes in corresponding one of the foldable side panels and a connecting head pressed into the countersunk tube.

2. The DIY cabinet as claimed in claim 1, wherein the front frame has an inside surface, a left side, a right side and multiple mortises formed in the inside surface on the left and right sides;

the rear frame has an inside surface, a left side, a right side and multiple mortises formed in the inside surface on the left and right sides;

the two foldable side panels are pivotally attached respectively between the two sides of the foldable frames; and the hinges are multiple countersunk flush mounted hinges and mounted respectively between the front and rear frames and the two foldable side panels.

3. The DIY cabinet as claimed in claim 2, wherein each countersunk flush mounted hinges hinge comprises:

two tenons respectively having an inside recess; and a metal pivot pivotally connected respectively in the inside recesses and between the two tenons and composed of two first sheets and two second sheets pivotally engaging the two first sheets.

4. The DIY cabinet as claimed in claim 3, wherein the cabinet further has at least one retractable door assembly mounted inside the foldable frame.

5. The DIY cabinet as claimed in claim 4, wherein each retractable door assembly has a doorjamb and a door pivotally attached to the doorjamb; and a rail assembly mounted inside the foldable frame to detachably engage one corresponding doorjamb and having a top rail attached to a bottom face of the top panel and a bottom rail attached to a top face of the bottom panel, wherein each rail has a moving block slidably mounted on each rail to detachably engage with the corresponding doorjamb by pins.

6. The DIY cabinet as claimed in claim 5, wherein the DIY cabinet further has multiple locking devices mounted between the foldable frame and the door of the door assembly, the locking device comprises:

a plate having a dent and attached to the foldable frame; and a spring-loaded ball attached to the door and containing a ball with a spring to detachably engage the detent in the plate by holding the ball in the dent.

7. The DIY cabinet as claimed in claim 6, wherein the DIY cabinet further has a shelf assembled and mounted inside the foldable frame by the pop-it fasteners.

8. The DIY cabinet as claimed in claim 1, wherein the cabinet further has at least one retractable door assembly mounted inside the foldable frame.

* * * * *